United States Patent [19]
Ripley

[11] 3,746,384
[45] July 17, 1973

[54] ENERGY ABSORBING AUTOMOBILE BUMPER
[75] Inventor: Marion M. Ripley, Baltimore, Md.
[73] Assignee: The Raymond Lee Organization, Inc., New York, N.Y. (part interest)
[22] Filed: Aug. 23, 1971
[21] Appl. No.: 173,880

[52] U.S. Cl. .................................. 293/86, 293/89
[51] Int. Cl. ........................................... B60r 19/06
[58] Field of Search .................. 293/63, 66, 70, 85, 293/86, 89

[56] References Cited
UNITED STATES PATENTS
2,186,137  1/1940  Halladay ............................. 293/85
1,496,112  6/1924  Banschbach ..................... 293/85 X Primary Examiner—Gerald M. Forlenza
Assistant Examiner—Robert Saifer
Attorney—Howard I. Podell

[57] ABSTRACT

An energy absorbing automobile bumper designed to absorb the shocks for front or rear end collisions and particularly to eliminate impact damage in collisions of up to 15 miles per hour, consisting of longitudinal support members to which the bumper is fastened, said support members being slidably mounted to the automobile frame, with slots in said support members containing compression springs, said compression springs being anchored to the automobile frame so as to limit the longitudinal travel of the support members and to absorb the imact energy of the collision.

2 Claims, 3 Drawing Figures

ENERGY ABSORBING AUTOMOBILE BUMPER

SUMMARY OF THE INVENTION

The purpose of this invention is to absorb the energy of front or rear and automobile collisions, and particularly to prevent damage to the automobile and its occupants in collisions of under 15 miles per hour. The impact energy of the collision is absorbed by compression springs mounted in the longitudinal support members of the automobile bumper, said longitudinal support members being mounted to the automobile frame so as to be free to slide in a longitudinal direction subject to the restraint of said compression springs.

BRIEF DESCRIPTION OF THE DRAWINGS

The objects and features of the invention may be understood with reference to the following detailed description of an illustrative embodiment of the invention taken together with the accompanying drawing in which.

DESCRIPTION OF THE PREFERRED EMBODIMENT

Figure 1:
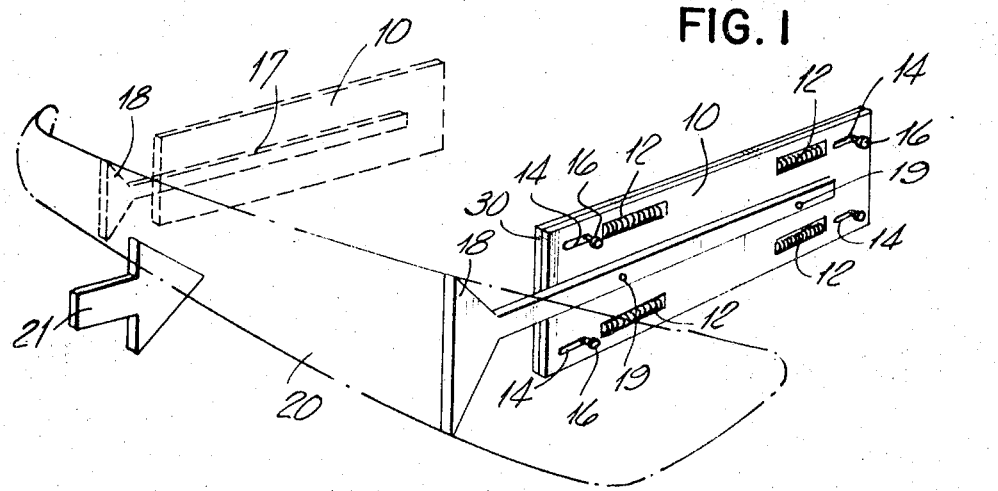
FIG. 1 is a perspective illustration of the longitudinal support member mounted to an automobile bumper.
Figure 2:
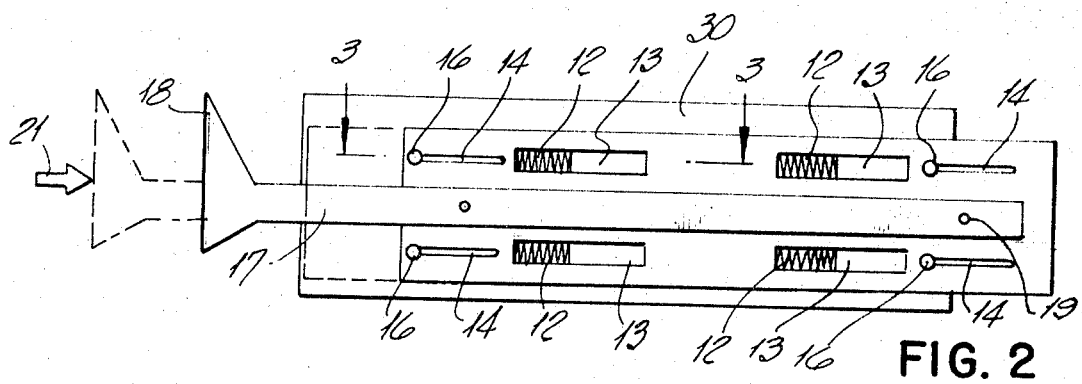
FIG. 2 is a side view of the support member, with the dotted lines indicating the position of the bumper and support member prior to collision.
Figure 3:
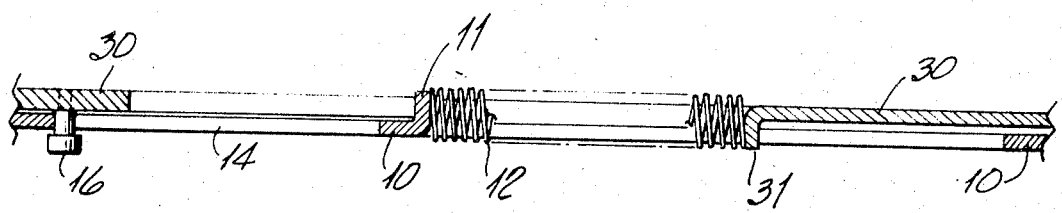
FIG. 3 is a cross-section along 3—3 of FIG. 2.

Turning now descriptively to the drawings, in which similar reference characters denote similar elements throughout the several views, FIG. 1 illustrates the manner in which an automobile bumper 20 is fastened to longitudinal support members 10, by means of support bracket 17. Support bracket 17 is riveted to the longitudinal support member 10 by rivets 19, and fastened to the bumper 20 at T-section 18 of the support bracket. Bolts 16 fasten through longitudinal slots 14 in the longitudinal support member 10 to the automobile frame 30. As shown in FIG. 2, compression springs 12 are located in longitudinal slots 13 of the support member, resting against stop 11 of the support member and stop 31 of the automobile frame. The dotted lines in FIG. 2 indicate the fully relaxed position of the automobile bumper and the support assembly. Impact forces of a collision in the direction indicated by arrow 21 acts to move the assembly to the position indicated by the solid lines, compressing the springs engaged between the stops of the longitudinal support member 10 and the automobile frame 30.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new, and desire to secure by Letters Patent of the United States is:

1. An energy absorbing automobile bumper support assembly designed to absorb the impact energy of front or rear end collisions consisting of a longitudinal support member linking the automobile bumper to the frame of the automobile, with said bumper being rigidly fastened to said longitudinal support member, where said longitudinal support member is bolted to the automobile frame through longitudinal slots in the longitudinal support member so as to permit travel in the longitudinal direction between said support member and the automobile frame, with additional longitudinal slots in said longitudinal support member in which additional slots are located coiled compression springs, said coiled compression springs being stopped from travel in the direction of the bumper by elements of the longitudinal support member, and said compression springs being stopped from travel in the direction away from the automobile bumper by stops in the automobile frame, such that longitudinal external impact forces against the bumper acts to push said bumper and said longitudinal support member against said compression springs, with the compression of said springs absorbing the external impact forces to the limit of the travel of said springs, and the walls of said longitudinal slots providing lateral support to the coiled compression springs located therein for the full length of each spring.

2. An energy absorbing automobile bumper support assembly as described in claim 1 in which the bumper is supported by two said longitudinal support members.

* * * * *